(12) United States Patent
Ly-Gagnon et al.

(10) Patent No.: US 11,751,144 B2
(45) Date of Patent: Sep. 5, 2023

(54) PREFERRED DEVICE SELECTION

(71) Applicant: Apple Inc., Cupertino, CA (US)

(72) Inventors: Yann Ly-Gagnon, San Francisco, CA (US); Arun Unkn, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 17/483,114

(22) Filed: Sep. 23, 2021

(65) Prior Publication Data

US 2023/0090401 A1    Mar. 23, 2023

(51) Int. Cl.
*H04W 52/08*    (2009.01)
*H04W 52/28*    (2009.01)
*H04W 52/24*    (2009.01)

(52) U.S. Cl.
CPC ......... *H04W 52/281* (2013.01); *H04W 52/08* (2013.01); *H04W 52/241* (2013.01); *H04W 52/245* (2013.01); *H04W 52/283* (2013.01)

(58) Field of Classification Search
CPC . H04W 52/281; H04W 52/08; H04W 52/241; H04W 52/245; H04W 52/283
See application file for complete search history.

(56) References Cited

U.S. PATENT DOCUMENTS

| | | | | |
|---|---|---|---|---|
| 9,743,440 | B2* | 8/2017 | Wietfeldt | H04W 88/06 |
| 9,808,705 | B2* | 11/2017 | Treadway | A63C 17/061 |
| 9,948,394 | B1* | 4/2018 | Bitra | H04B 10/079 |
| 9,986,479 | B2* | 5/2018 | Zacharias | H04L 5/0098 |
| 10,070,474 | B2* | 9/2018 | Wietfeldt | H04W 88/06 |
| 10,368,255 | B2* | 7/2019 | Gunasekara | H04B 17/318 |
| 10,537,703 | B2* | 1/2020 | Tyler | A61N 1/36025 |
| 10,863,319 | B2* | 12/2020 | Edge | H04W 4/029 |
| 11,184,810 | B2* | 11/2021 | Reddy | H04W 36/0022 |
| 11,211,964 | B1* | 12/2021 | Chang | H04B 1/40 |
| 11,349,544 | B2* | 5/2022 | Chang | H04B 7/0608 |
| 11,452,032 | B2* | 9/2022 | Gupta | H04W 68/005 |
| 11,601,800 | B2* | 3/2023 | Ramasamy | H04W 4/023 |
| 11,622,281 | B2* | 4/2023 | Hardin | H04W 52/367 370/329 |
| 2014/0092771 | A1* | 4/2014 | Siomina | H04W 24/08 370/252 |

(Continued)

FOREIGN PATENT DOCUMENTS

WO    WO-2022081315 A2 *    4/2022

*Primary Examiner* — Hai V Nguyen
(74) *Attorney, Agent, or Firm* — Fish & Richardson P.C.

(57) ABSTRACT

Disclosed are methods, systems, and computer-readable medium to perform operations for selecting a device to prioritize for a high power link. The operations include detecting, in proximity of a mobile device, a first and second available devices. The operations also include establishing a respective connection with each of the first and second available device using a first radio access technology (RAT). Further, the operations include determining, using the respective connections, one or more metrics associated with first available device and the second available device, where the one or metrics comprise a respective angle of arrival at the mobile device corresponding to the first available device and the second available device. Further, the operations include determining, based at least on the one or more metrics, to establish a high power link with the first available device using a second RAT, where the second RAT utilizes more power than the first RAT.

20 Claims, 4 Drawing Sheets

(56) References Cited

U.S. PATENT DOCUMENTS

| | | | |
|---|---|---|---|
| 2015/0257118 A1* | 9/2015 | Siomina | H04B 17/21 |
| | | | 455/456.1 |
| 2016/0338121 A1* | 11/2016 | Wietfeldt | H04W 72/541 |
| 2017/0155443 A1* | 6/2017 | Haziza | G01S 5/0263 |
| 2017/0257807 A1* | 9/2017 | Zacharias | H04W 76/28 |
| 2017/0308845 A1* | 10/2017 | Henry | G06K 19/07767 |
| 2017/0318617 A1* | 11/2017 | Wietfeldt | H04W 8/005 |
| 2018/0088208 A1* | 3/2018 | Gagrani | H04W 64/003 |
| 2018/0352473 A1* | 12/2018 | Gunasekara | H04W 16/14 |
| 2019/0037418 A1* | 1/2019 | Gunasekara | H04W 24/02 |
| 2019/0222652 A1* | 7/2019 | Graefe | H04L 67/12 |
| 2019/0230475 A1* | 7/2019 | Edge | H04W 64/00 |
| 2019/0263356 A1* | 8/2019 | Golsch | G01S 13/765 |
| 2019/0319868 A1* | 10/2019 | Svennebring | H04W 24/08 |
| 2019/0356397 A1* | 11/2019 | DaSilva | H04B 17/17 |
| 2019/0364492 A1* | 11/2019 | Azizi | H04W 36/0009 |
| 2019/0373301 A1* | 12/2019 | Gunasekara | H04N 21/47202 |
| 2020/0205062 A1* | 6/2020 | Azizi | H04W 68/005 |
| 2020/0283125 A1* | 9/2020 | Dong | B64C 27/32 |
| 2020/0283126 A1* | 9/2020 | Dong | B64C 27/32 |
| 2020/0322868 A1* | 10/2020 | Claffey | H04W 40/02 |
| 2021/0051532 A1* | 2/2021 | Reddy | H04W 76/15 |
| 2021/0076396 A1* | 3/2021 | Chen | H04W 72/542 |
| 2021/0215789 A1* | 7/2021 | Hu | G01S 7/415 |
| 2021/0242565 A1* | 8/2021 | Kim | H01Q 1/24 |
| 2021/0250775 A1* | 8/2021 | Hardin | H04W 52/367 |
| 2021/0311162 A1* | 10/2021 | Mai | G01S 7/415 |
| 2021/0385606 A1* | 12/2021 | Chen | H04W 12/50 |
| 2021/0409088 A1* | 12/2021 | Chang | H04W 52/288 |
| 2022/0011394 A1* | 1/2022 | Smith | G01S 5/0218 |
| 2022/0014868 A1* | 1/2022 | Binn | H04R 3/12 |
| 2022/0016984 A1* | 1/2022 | Huang | B62M 6/55 |
| 2022/0067651 A1* | 3/2022 | Kawaguchi | G06Q 10/0833 |
| 2022/0082653 A1* | 3/2022 | Manolakos | G01S 13/003 |
| 2022/0086713 A1* | 3/2022 | Määttänen | H04W 36/00837 |
| 2022/0110018 A1* | 4/2022 | Jha | H04W 28/085 |
| 2022/0124535 A1* | 4/2022 | Manolakos | G01S 7/2883 |
| 2022/0137204 A1* | 5/2022 | Nguyen | G01S 13/765 |
| | | | 342/28 |
| 2022/0225418 A1* | 7/2022 | Wang | H04W 52/48 |
| 2022/0314934 A1* | 10/2022 | Smith | B60R 25/245 |
| 2022/0322055 A1* | 10/2022 | Zorgui | G01S 5/0036 |
| 2022/0337986 A1* | 10/2022 | Cheong | H04W 4/80 |
| 2022/0388505 A1* | 12/2022 | Sharma Banjade | G08G 1/005 |
| 2022/0408240 A1* | 12/2022 | Ramasamy | H04W 8/205 |
| 2022/0416427 A1* | 12/2022 | Hsu | H01Q 9/0421 |
| 2023/0007483 A1* | 1/2023 | Mueck | H04W 12/069 |

\* cited by examiner

PREFERRED DEVICE SELECTION

TECHNICAL FIELD

The disclosure relates to systems and techniques for preferred device selection, for example, to prioritize for a connection with a mobile computing device.

BACKGROUND

Vehicles have proximity key fobs that can perform actions (e.g., unlocking the doors of a vehicle) when user carrying the key fobs are close to the vehicles. Recently, key fobs, or at least some of their functionalities, are being replaced by mobile computing devices that are commonly carried by users, such as smartphones and smartwatches. For example, a smartphone can communicate with a vehicle to automatically unlock the doors of the vehicle when a user carrying the smartphone is close to the vehicle.

SUMMARY

In existing systems, a mobile computing device wirelessly communicates with a vehicle in order to perform actions in connection with the vehicle (e.g., determining a distance to a vehicle, communicating with the vehicle, sending instructions to the vehicle, etc.). For example, the mobile computing device may communicate with a vehicle that is available to a user carrying the mobile computing device (e.g., a vehicle with which the mobile computing device has previously communicated or has been configured to communicate). In some systems, the mobile computing device is configured to communicate with the vehicle using an ultra-wideband (UWB) radio. The UWB radio establishes an UWB link with the vehicle, and the mobile computing device uses the UWB link to communicate with the vehicle or perform actions in connection with the vehicle. For example, if the user comes in proximity of the vehicle while traveling toward the vehicle at a particular angle (or range of angles) relative to the vehicle, the vehicle may unlock and allow access to the vehicle (among other actions).

However, in some scenarios, the user may be in proximity of more than one available vehicle (e.g., multiple vehicles in a driveway). In existing systems, the mobile computing device is configured to establish an UWB link with each vehicle, and perform actions, such as unlocking doors, in connection with each vehicle. However, it is unlikely that the user is going to use all available vehicles. Thus, establishing an UWB link with each vehicle and performing actions in connection with each vehicle unnecessarily consumes resources of the mobile computing device (e.g., power and communication resources). Additionally, establishing an UWB link with each vehicle may result in potential coexistence issues between the links (e.g., interference), thereby affecting the reliability of the links. Thus, it is desirable for the mobile computing device to avoid establishing a wireless link with each available vehicle, and instead, establishing a wireless link with the vehicle that the user is likely going to use. This is especially true if the radio is a high power radio, such as UWB radio, that consumes more resources than other available radios.

This disclosure describes systems and methods for determining a vehicle to prioritize for UWB link establishment, e.g., in scenarios where more than one vehicle is available to a user. In some embodiments, the mobile computing device uses a second radio that uses fewer resources (e.g., is more power efficient) than the UWB radio in order to select a vehicle for UWB link establishment. In one example, the mobile computing device uses the second radio to establish links with the available vehicles. As the user approaches the vehicles, the mobile computing device communicates with the vehicles to determine metrics that can be used to select the vehicle to prioritize. Example metrics include a signal strength indicator (RSSI) of signals received by the mobile computing device via the links, the signal-to-noise ratio (SNR) of signals received by the mobile computing device via the links, and the angle of arrival of the mobile computing device to each vehicle. The mobile computing device samples the links, perhaps a threshold number of times or for a specified period, in order to monitor the metrics over time.

The mobile computing device determines the vehicle to prioritize based on the analyzed metrics. In one example, if one of the vehicles has a constant angle of arrival over a period of time, and the other vehicles do not, the mobile computing device prioritizes the vehicle with the constant angle of arrival. As described herein, the constant angle of arrival over a period of time is indicative of a user carrying the mobile computing device moving toward the vehicle, thereby indicating that the user is seeking to use the vehicle.

Aspects of the subject matter described in this specification may be embodied in methods that include the actions of detecting a plurality of available devices in proximity of a mobile device; establishing a respective connection with at least a first device and a second device of the plurality of available devices using a first radio access technology (RAT); determining, using the respective connections, one or more metrics associated with the first device and the second device, wherein the one or metrics comprise a respective angle of arrival at the mobile device for each of the first device and the second device; and determining, based on the one or more metrics, to establish a high power link with the first device using a second RAT, wherein the second RAT utilizes more power than the first RAT.

The previously-described implementation is applicable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the method further involves establishing the high power link with the first device using the second RAT; and using the high power link to perform a ranging action in connection with the first device.

In some implementations, the first RAT is based on a BLUETOOTH™ protocol.

In some implementations, the second RAT is based on an ultra-wideband communication protocol.

In some implementations, determining, using the respective connections, one or more metrics associated with the first device and the second device involves receiving, from the first device and the second device, at least one respective signal; and determining the one or more metrics based at least on the at least one respective signal.

In some implementations, the respective angle of arrival of the mobile device to each of the first device and the second device is determined based at least on an angle of arrival of the at least one respective signal received from the first device and the second device.

In some implementations, determining, based on the one or more metrics, to establish the high power link with the first device using the second RAT involves determining to establish the high power link responsive to the mobile device having a substantially consistent angle of arrival with respect to the first device over a period of time.

The details of one or more implementations of the subject matter described in this disclosure are set forth in the accompanying drawings and the description. Other features, aspects, and advantages of the subject matter will become apparent from the description, the drawings, and the claims.

DETAILED DESCRIPTION

This disclosure describes systems and methods for determining a vehicle to prioritize for high power link establishment, e.g., in scenarios where more than one vehicle is available to a user that is carrying a mobile computing device configured to communicate with vehicles. In some embodiments, the mobile computing device establishes low power links (e.g., links that consume less power than the high power link) with the vehicles in order to determine the vehicle to prioritize. After establishing the low power links, the mobile computing device exchanges communications with the vehicles to measure metrics that enable the mobile computing device to determine the vehicle to prioritize.

In some examples, the metrics include a signal strength indicator (RSSI) of signals received via the low power links, the signal-to-noise ratio (SNR) of signals received via the low power links, and the angle of arrival of the mobile computing device to each vehicle (e.g., determined based on the angle of arrival of the signals received via the low power links). The mobile computing device selects the vehicle to prioritize based on an analysis of the metrics, perhaps over a period of time. In one example, if the angle of arrival to one vehicle is a constant over a period of time, and the angle of arrival to the other vehicles is not, the mobile computing device prioritizes the vehicle with the constant angle of arrival. As described below, the constant angle of arrival toward a vehicle is indicative of the user moving toward the vehicle, which indicates that the user is likely to use that vehicle.

Figure 1:
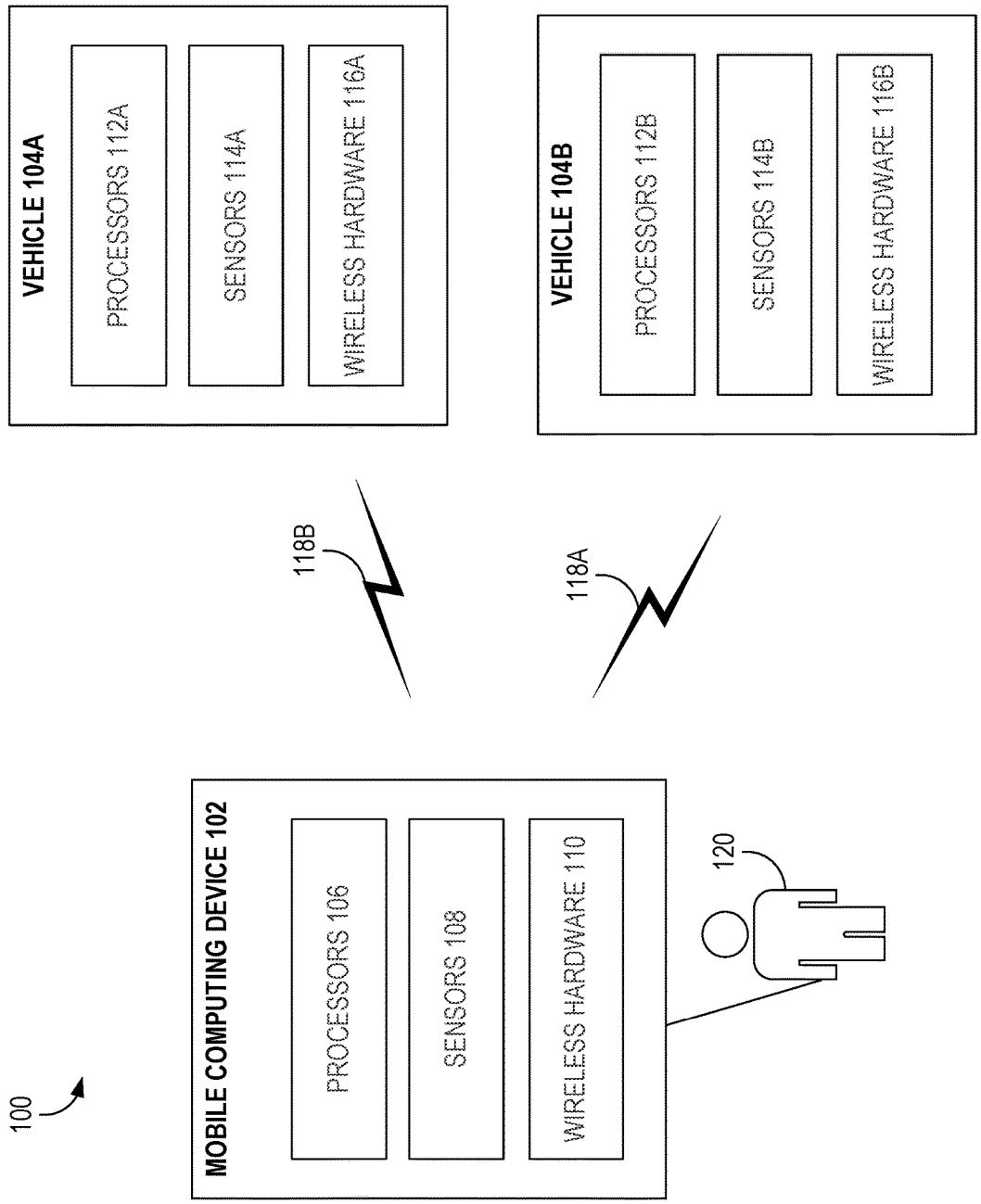
FIG. 1 illustrates a block diagram of an example system, according to some implementations of the present disclosure.

FIG. 1 illustrates a block diagram of an example system 100, according to some implementations. The system 100 includes a mobile computing device 102 and one or more other devices or systems, such as vehicles 104A, 104B (collectively referred to as "vehicles 104"). In the example of FIG. 1, the mobile computing device 102 is carried by a user 120 (e.g., physically carried by user 120, attached to the person of the user 120, or attached to clothing worn by the user 120). The system 100 can be located indoors (e.g., in a parking garage), outdoors (e.g., a driveway or parking lot), or partially indoors and partially outdoors.

The system 100 is shown for illustration purposes only, as the system can include additional components or have one or more components removed without departing from the scope of the disclosure. For instance, the system 100 can include devices in addition to or instead of the vehicles 104. The additional or alternative devices can be vehicles, desktop computers, smart home devices (e.g., door locks, home security devices, displays, speakers, electric outlets, entertainment centers, set-top boxes, climate control modules, smart home control modules, smart appliances), or any other device capable of wireless communications.

Additionally and/or alternatively, the system 100 can include more than one user device (e.g., a smartphone or a wearable device). In some examples, the user devices may communicate with one another using wireless communication protocols, such as ultra-wideband (UWB), Bluetooth®, Wi-Fi, Bluetooth® Low Energy (BLE, Bluetooth® LE, Bluetooth® Smart), the Internet, an intranet, a cellular communications network, a packet network, a short-range wireless network, wireless personal area network, and/or any other wired and/or wireless communication network.

Figure 4:
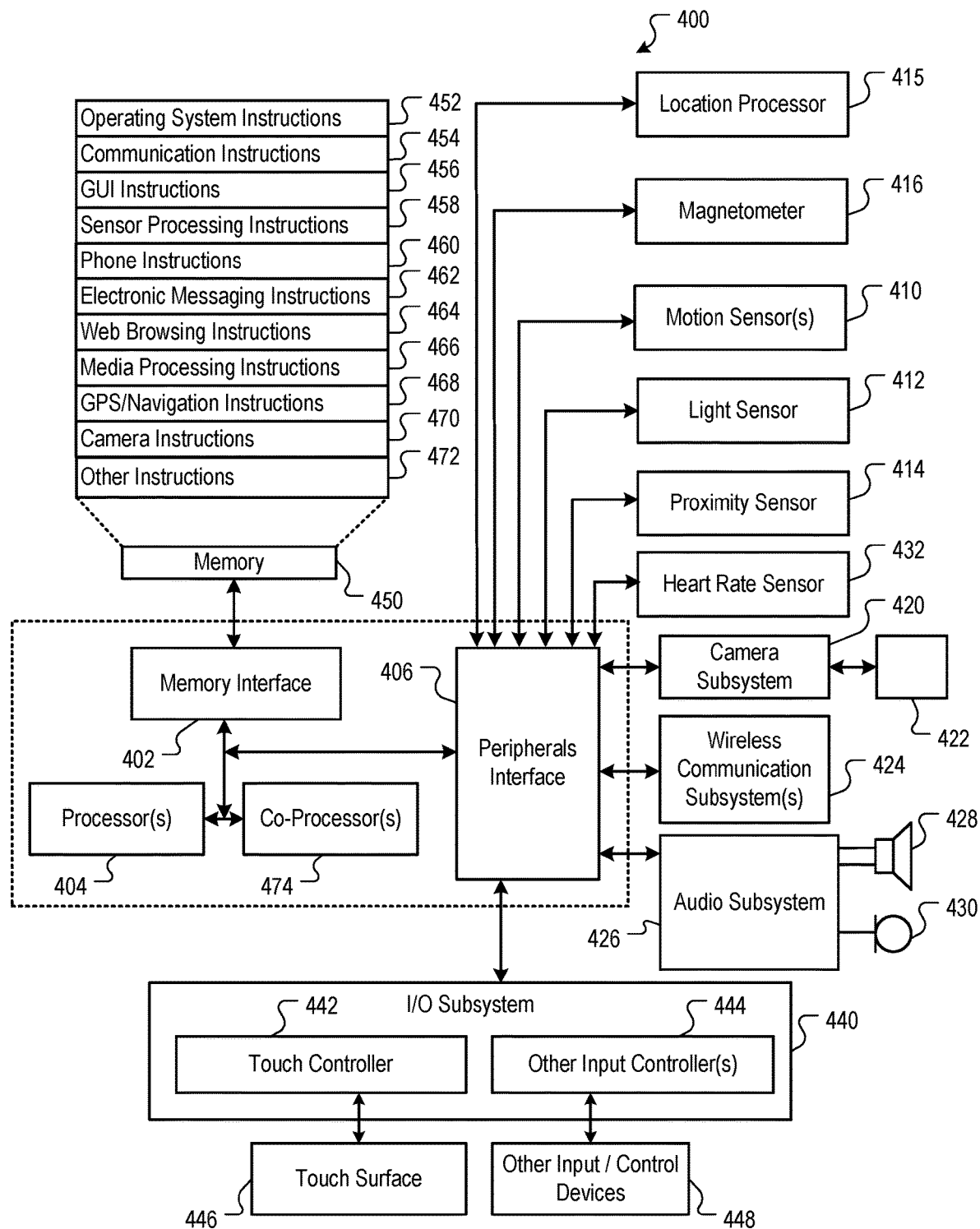
FIG. 4 illustrates a block diagram of an example architecture for implementing the features and processes described in reference to FIGS. 1-3, according to some implementations of the present disclosure.

As shown in FIG. 1, the mobile computing device 102 includes processors 106, sensors 108, and wireless hardware 110. The mobile computing device 102 can be any one of many types of computer systems devices that are mobile or portable and that perform wireless communications. Example devices include mobile telephones, smart phones (e.g., iPhone™, Android™-based phones), portable gaming devices, laptops, wearable devices (e.g. smartwatches, smart glasses), PDAs, portable Internet devices, music players, data storage devices, or other handheld devices. Note that the mobile computing device 102 can include other subsystems not shown in FIG. 1. An example mobile computing device is shown in FIG. 4, described in more detail below.

The wireless hardware 110 can include any of a variety of communication elements (e.g., antenna(s) for wireless communication, analog and/or digital communication circuitry/controllers, etc.) and enable the mobile computing device 102 to wirelessly communicate using one or more wireless communication protocols. The wireless hardware 110 can include one or more parts of a receive and/or transmit chain that may be shared between multiple wireless communication standards. For example, the mobile computing device 102 may be configured to communicate using either of Bluetooth or UWB using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, the mobile computing device 102 may include separate transmit and/or receive chains (e.g., including separate antennas and other radio components) for each wireless communication protocol with which it is configured to communicate. As a further possibility, the mobile computing device 102 may include one or more radios or radio components which are shared between multiple wireless communication protocols, and one or more radios or radio components which are used exclusively by a single wireless communication protocol. For example, the mobile computing device 102 may include a shared radio for communicating using either of LTE or CDMA2000 1×RTT, and separate radios for communicating using each of UWB, Wi-Fi, and/or Bluetooth. Other configurations are also possible.

The vehicles 104A, 104B include processors 112A, 112B, sensors 114A, 114B, and wireless devices 116A, 116B, respectively. The vehicles 104 are machines that transport people and/or cargo. The vehicles 104 can be terrestrial motor vehicles, watercrafts, aircraft, or other types of vehicles. The vehicles 104 include an engine or motor such as an internal combustion engine, an electric motor, or a hybrid engine configuration. Example vehicles include cars, trucks, boats, and trains. Note that the vehicles 104 include other subsystems not shown in FIG. 1. Examples of such sub-systems include, but are not limited to, imaging systems, radar, LIDAR, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

The mobile computing device 102 and the vehicles 104 are configured to communicate wirelessly using their respective wireless hardware. Wireless communication links, e.g., links 118A, 118B (collectively referred to as "links 118"), can be established between the mobile computing device 102 and the vehicles 104. The links 118 are implemented using a radio access technology (RAT), such as ultra-wideband (UWB), Bluetooth®, Wi-Fi, Bluetooth® Low Energy (BLE, Bluetooth® LE, Bluetooth® Smart), the Internet, an intranet, a cellular communications network, a packet network, a short-range wireless network, wireless personal area network, and/or any other wired and/or wireless communication network. The communications exchanged via the links 118 can be RF signals, packets, messages, or other communications using a common protocol, e.g., Hypertext Transfer Protocol (HTTP) or Hypertext Transfer Protocol Secure (HTTPS). The mobile computing device 102 and/or the vehicles 104 can also communicate with other computing devices not shown in FIG. 1.

In some embodiments, the mobile computing device 102 is configured to establish a link with a vehicle once the distance between them is less than or equal to a predetermined threshold distance, once the vehicle is within range of a RAT of the mobile computing device 102, and/or once the mobile computing device 102 enters a geofenced area. In these embodiments, the vehicle may be parked and the mobile computing device 102 may be carried the user 120 approaching the vehicle. Alternatively, the vehicle may be moving toward the user 120 carrying the mobile computing device 102 while the user 120 is also moving toward the vehicle or while the user 120 is stationary. Establishing a link with the vehicle enables the mobile computing device 102 to perform operations in connection to the vehicle, such as ranging the vehicle, communicating with the vehicle, or and/or instructing the vehicle to perform actions.

In some embodiments, the mobile computing device 102 is configured to communicate using a particular RAT for a specific purpose. Various RATs may have advantages and disadvantages relative to other RATs, which may lead to each RAT being advantageous for particular applications. For example, at longer distances (e.g., greater than a predetermined threshold distance), the mobile computing device 102 and the vehicles 104 communicate using a cellular communications network. And, in close proximity (e.g., less than or equal to the predetermined threshold distance), the mobile computing device 102 and the vehicles 104 communicate using short-range wireless communication networks, such as UWB, Bluetooth®, Wi-Fi, and BLE.

In some embodiments, the mobile computing device 102 is configured to use a particular RAT for short-range communications with the vehicle. As stated, various RATs may have advantages and disadvantages relative to other RATs. In one embodiment, UWB (also referred to as "pulse radio"), e.g., as described in IEEE 802.15.4-2015, is capable of providing wireless communications across large bandwidths (e.g., 500 MHz or more) with precise timing. UWB uses radiofrequency pulses and has high gain. This allows UWB communications to penetrate through walls and obstacles and provide highly precise ranging. Thus, UWB is well suited for short-range communications, particularly if multi-path interference is a concern. As such, UWB is well suited for ranging and positioning applications. Accordingly, the mobile computing device 102 is configured to establish a UWB link with the vehicle in order to perform ranging operations (e.g., determine a position of the vehicle with respect to the mobile computing device).

However, in some scenarios, more than one vehicle may be in proximity of the mobile computing device 102 (e.g., within a threshold distance or within a range of a RAT of the mobile computing device). Although more than one vehicle is available, the user 120 is likely to only use one vehicle. Therefore, it would be inefficient to establish links with all of the vehicles and perform operations (e.g., ranging) in connection with all of the vehicles. This is especially true if the RAT that is used to perform the operations consumes more power than other available RATs. Such a RAT is also referred to as a "high power RAT." For example, a UWB radio often consumes significant power while in a full-power state. Therefore, causing a UWB radio to communicate with each of the vehicles is wasteful of the power of the mobile computing device 102.

In some embodiments, rather than establishing a high power link, e.g., a UWB link, with each vehicle, the mobile computing device 120 first determines a vehicle to prioritize for the high power link. In particular, the mobile computing device 102 determines the vehicle that is likely to be used by the user 120, and then establishes a high power link with that vehicle. By doing so, the mobile computing device 102 avoids establishing high power links with vehicles that the user 120 will not be using, thereby avoiding unnecessary consumption of power and system resources.

In some embodiments, in order to determine the vehicle to prioritize in scenarios where more than one available vehicle (also referred to as a preferred vehicle) is in proximity, the mobile computing device 102 establishes a low power link (e.g., a link more power efficient than the high power link) with each vehicle. As explained in more detail below, the mobile computing device 102 uses the low power links to measure metrics for each vehicle that can be used to determine the vehicle to prioritize. In one example, the low power link is Bluetooth. Generally, Bluetooth is more power efficient and has longer range than UWB. Therefore, Bluetooth is well suited for determining the metrics that can be used to determine the vehicle to prioritize. Other low power links are possible.

In some embodiments, the metrics include signal strength indicator (RSSI) of signals received via the low power links, signal-to-noise ratio (SNR) of signals received via the low power links, a respective angle of arrival of the mobile computing device 102 to each vehicle, respective angle of departures of the signals received via the low power links, a packet error rate (PER), bit error rate (BER), and/or vehicle latency for sending back the packets. In particular, the mobile computing device 102 uses communications with the vehicles via the low power links to determine at least a subset of the metrics for each vehicle. Other metrics that are not determined using the low power links include location of the mobile computing device 102, motion behavior of the user 120, and historical user behavior.

In one example, after establishing the low power links with the vehicles, the mobile computing device 102 transmits to the vehicles a first communication. The first communication can be an RF signal or a packet that includes an angle of arrival payload. In response to receiving the first communication, the vehicles are configured to transmit to the mobile computing device a second communication (e.g., an RF signal or packet that includes the angle of arrival payload). In another example, the vehicles may be configured to send the mobile computing device 102 a communication upon establishment of the low power links (i.e., without receiving the first communication from the mobile computing device).

The mobile computing device 102 uses the communications received from the vehicles to determine the metrics that can be used to determine the vehicle to prioritize. As an example, the mobile computing device 102 uses a communication with a vehicle in order to determine the angle of arrival to that vehicle. In this technique, the mobile computing device 102 determines the angle of arrival to a vehicle based on a time distance of arrival (TDoA) and/or a phase difference of arrival (PDoA) of the communication received from the vehicle. The angle of arrival payload can include an identification of the transmitting vehicle, a location of the vehicle, and/or a time at which the payload was transmitted. The mobile computing device 102 calculates the angle of arrival based on a measurement of the communication using two different antennas and based on the information included in the payload. For example, the mobile computing device 102 uses the phase difference between the two different antennas and a known distance between the two antennas to determine the angle of arrival of the communication (and in turn, the angle of arrival to the vehicle).

In some embodiments, the mobile computing device 102 is configured to sample the low power link for a period of time (e.g., 1 second) to determine the metrics for each vehicle over that period of time. The mobile computing device 102 determines the vehicle to prioritize based on the metrics for the vehicles over that period of time. In some examples, the mobile computing device 102 applies weights to the metrics in order to control the effect that each metric has on the determination of the vehicle to prioritize.

In one example, if all of the metrics other than the angle of arrival remain constant for the vehicles over a period of time, the mobile computing device 102 then analyzes the angle of arrival to each vehicle. If one of the vehicles has a constant angle of arrival, and the other vehicles do not, the mobile computing device 102 prioritizes the vehicle with the constant angle of arrival for the high power link.

In some embodiments, if the system 100 includes more than device associated with the user 120 (e.g., another device carried by the user 120), each device associated with the user 102 establishes low power links with the available vehicles. Then, each device determines the metrics for high power link prioritization. The metrics are received by the mobile computing device 102. The mobile computing device 102 uses the measured metrics from the user devices to perform the prioritization calculations. Doing so improves the accuracy of the calculations.

FIG. 2A and FIG. 2B illustrates an example system determining a vehicle to prioritize for high power link establishment, according to some implementations. In the scenario of FIGS. 2A, 2B, a user carrying the mobile computing device 102 is approaching an area in which the vehicles 104A, 104B are parked. The vehicles 104A, 104B are vehicles available to the user 120 (also referred to as preferred vehicles). An available vehicle is one that can be used by the user, e.g., as determined by a previous authorization. For example, the vehicles 104A, 104B may be vehicles that are owned by the user or vehicles that the user can select in a rental car lot. Other examples are possible. Note that in this example the vehicles 104A, 104B are stationary, but that at least one of the vehicles may be moving in other examples.

As the user 120 approaches the vehicles 104A, 104B, the mobile computing device 102 detects that the vehicles are in proximity. For example, the mobile computing device 102 determines that the distance to the vehicles is less than or equal to a predetermined threshold distance, that the vehicles are within range of a particular RAT (e.g., UWB) of the mobile computing device 102, or that the mobile computing device 102 has entered a geofenced area. In response to detecting that more than one available vehicle is in proximity, the mobile computing device 102 determines to perform a prioritization operation in order to determine the vehicle to prioritize for a high power link. In a first step of the prioritization operation, the mobile computing device 102 establishes low power links 202A, 202B with the vehicles 104A, 104B, respectively. The mobile computing device 102 then measures metrics that can be used to determine the vehicle to prioritize.

As shown in FIG. 2A, at a first time, t, the mobile computing device 102 uses the low power links 202A, 202B to measure a first instance of the metrics. In this example, the mobile computing device 102 receives communications from the vehicles 104A, 104B via the lower power links 202A, 202B. The mobile computing device 102 uses the communications to calculate RSSI of the communications, SNR of the communications, and an angle of arrival to each vehicle. To determine the angle of arrival to each vehicle, the mobile computing device receives a first communication from each vehicle via the antennas 206A, 206B. The mobile computing device 102 uses the phase difference between the antennas 206A, 206B and a known distance between the two antennas to determine the angle of arrival of the communication (and in turn, the angle of arrival to the vehicle). As shown in FIG. 2A, the angle of arrival to the vehicle 104A is 0 and the angle of arrival to the vehicle 104B is 20 degrees.

As shown in FIG. 2B, at a second time, t+Δ, the mobile computing device 102 uses the low power links 202A, 202B to measure a second instance of the metrics. In some examples, the second time may be based on a maximum walking speed of the user. The mobile computing device 102 then uses both instances of the metrics to determine the vehicle to prioritize. In this example, RSSI and SNR have stayed constant (or nearly constant within a threshold) in both instances. Thus, the mobile computing device 102 analyzes the angle of arrival for the signal coming from vehicles. As shown in FIG. 2B, the angle of arrival of the signal from the vehicle 104A is still 0, while the angle of arrival from the vehicle 104B has changed to 20 degrees. Because the constant angle of arrival over a period of time is indicative of a user carrying the mobile computing device moving toward the vehicle, the mobile computing device 102 determines that the user is likely going to use vehicle 104A and establishes a high power link with vehicle 104A.

Figure 3:
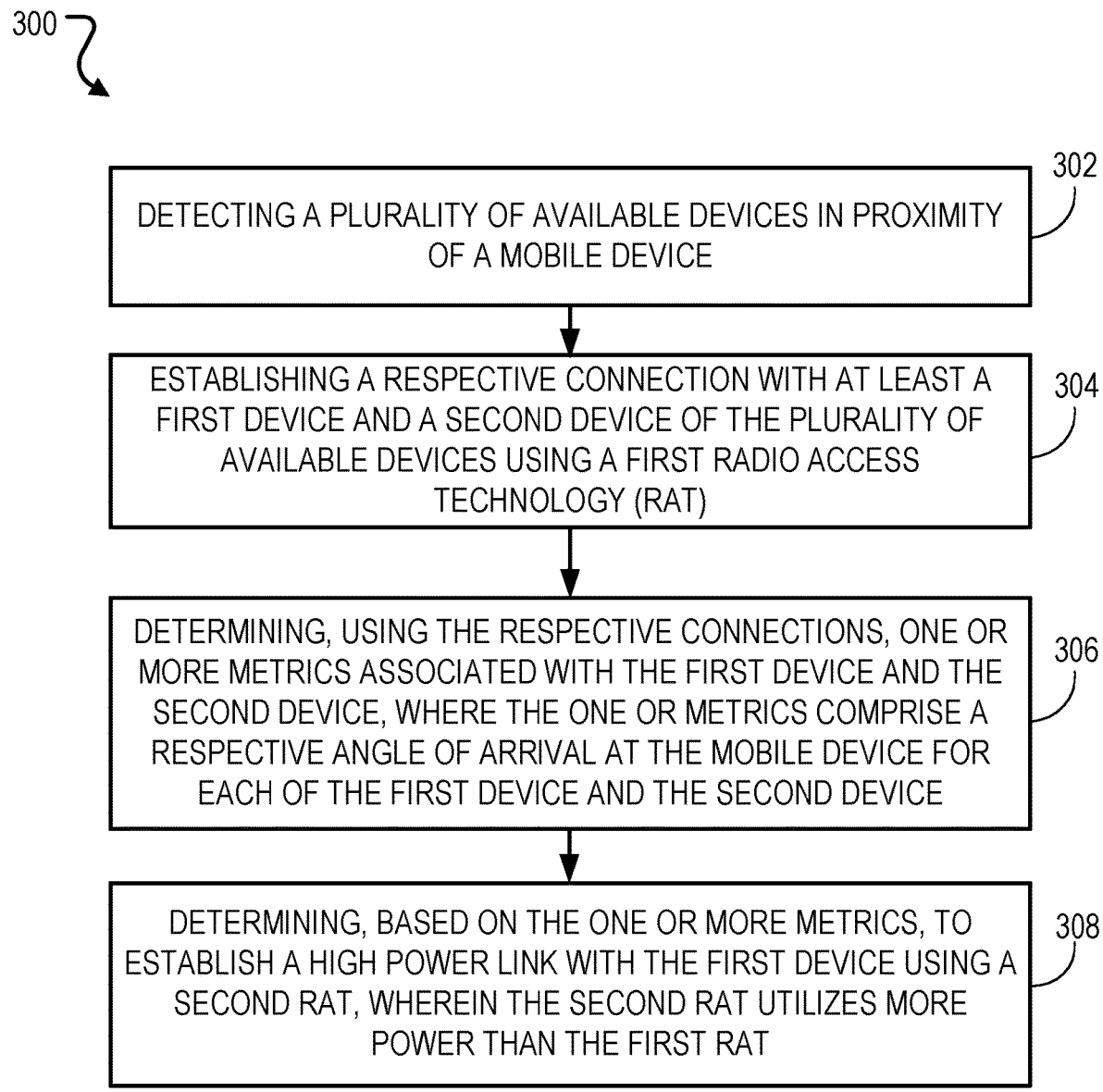
FIG. 3 illustrates a flowchart of an example method, according to some implementations of the present disclosure.

FIG. 3 shows an example method, according to some implementations. The method 300 is for selecting a device to prioritize for a high power link. For clarity of presentation, the description that follows generally describes method 300 in the context of the other figures in this description. However, it will be understood that method 300 can be performed, for example, by any suitable system, environment, software, hardware, or a combination of systems, environments, software, and hardware, as appropriate. In some implementations, various steps of method 300 can be run in parallel, in combination, in loops, or in any order.

At step 302, method 300 involves detecting a plurality of available devices in proximity of a mobile device.

At step 304, method 300 involves establishing a respective connection with at least a first device and a second device of the plurality of available devices using a first radio access technology (RAT).

At step 306, method 300 involves determining, using the respective connections, one or more metrics associated with the first device and the second device, where the one or metrics comprise a respective angle of arrival at the mobile device for each of the first device and the second device.

At step 308, method 300 involves determining, based on the one or more metrics, to establish a high power link with the first device using a second RAT, wherein the second RAT utilizes more power than the first RAT.

In some implementations, the method 300 further involves establishing the high power link with the first device using the second RAT; and using the high power link to perform a ranging action in connection with the first device.

In some implementations, the first RAT is based on a BLUETOOTH™ protocol.

In some implementations, the second RAT is based on an ultra-wideband communication protocol.

In some implementations, determining, using the respective connections, one or more metrics associated with the first device and the second device involves receiving, from the first device and the second device, at least one respective signal; and determining the one or more metrics based at least on the at least one respective signal.

In some implementations, the respective angle of arrival of the mobile device to each of the first device and the second device is determined based at least on an angle of arrival of the at least one respective signal received from the first device and the second device.

In some implementations, determining, based on the one or more metrics, to establish the high power link with the first device using the second RAT involves determining to establish the high power link responsive to the mobile device having a substantially consistent angle of arrival with respect to the first device over a period of time. A substantially consistent angle is one that remains within a threshold (e.g., a predetermined threshold) for a period of time (e.g., a predetermined period of time). For example, a substantially consistent angle is one that remains within a threshold of a starting angle for a period of time.

Figure 2:
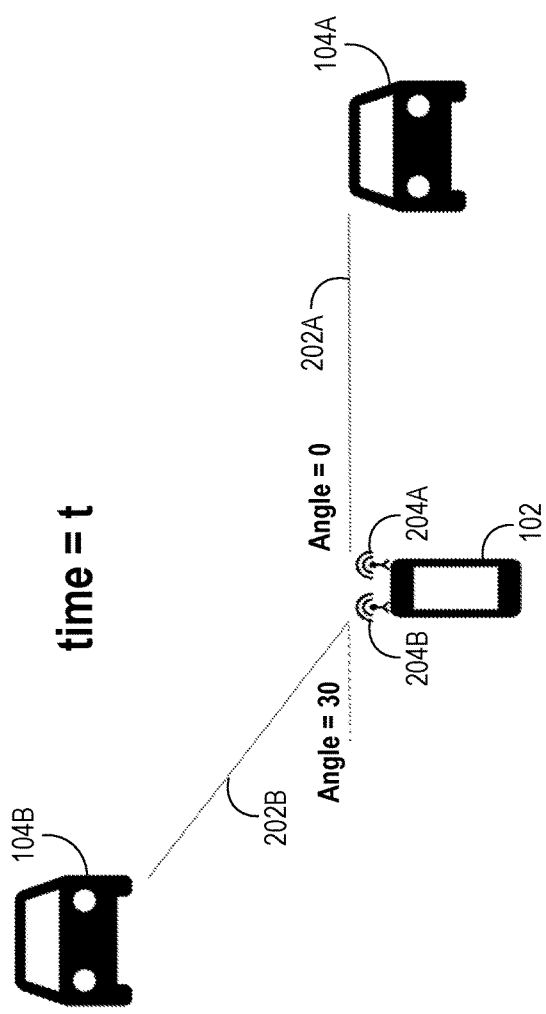
FIG. 2A and FIG. 2B illustrates an example system that determines a vehicle to prioritize for high power link establishment, according to some implementations of the present disclosure.

FIG. 4 is a block diagram of an example device architecture 400 for implementing the features and processes described in reference to FIGS. 1-3. For example, the architecture 400 can be used to implement the mobile computing device 102 and/or subsystems of the vehicles 104. Architecture 400 may be implemented in any device for generating the features described in reference to FIGS. 1-3, including but not limited to desktop computers, server computers, portable computers, smart phones, tablet computers, game consoles, wearable computers, set top boxes, media players, smart TVs, and the like.

The architecture 400 can include a memory interface 402, one or more data processor 404, one or more data co-processors 474, and a peripherals interface 406. The memory interface 402, the processor(s) 404, the co-processor(s) 474, and/or the peripherals interface 406 can be separate components or can be integrated in one or more integrated circuits. One or more communication buses or signal lines may couple the various components.

The processor(s) 404 and/or the co-processor(s) 474 can operate in conjunction to perform the operations described herein. For instance, the processor(s) 404 can include one or more central processing units (CPUs) that are configured to function as the primary computer processors for the architecture 400. As an example, the processor(s) 404 can be configured to perform generalized data processing tasks of the architecture 400. Further, at least some of the data processing tasks can be offloaded to the co-processor(s) 474. For example, specialized data processing tasks, such as processing motion data, processing image data, encrypting data, and/or performing certain types of arithmetic operations, can be offloaded to one or more specialized co-processor(s) 474 for handling those tasks. In some cases, the processor(s) 404 can be relatively more powerful than the co-processor(s) 474 and/or can consume more power than the co-processor(s) 474. This can be useful, for example, as it enables the processor(s) 404 to handle generalized tasks quickly, while also offloading certain other tasks to co-processor(s) 474 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 404 for further analysis.

Sensors, devices, and subsystems can be coupled to peripherals interface 406 to facilitate multiple functionalities. For example, a motion sensor 410, a light sensor 412, and a proximity sensor 414 can be coupled to the peripherals interface 406 to facilitate orientation, lighting, and proximity functions of the architecture 400. For example, in some implementations, a light sensor 412 can be utilized to facilitate adjusting the brightness of a touch surface 446. In some implementations, a motion sensor 410 can be utilized to detect movement and orientation of the device. For example, the motion sensor 410 can include one or more accelerometers (e.g., to measure the acceleration experienced by the motion sensor 410 and/or the architecture 400 over a period of time), and/or one or more compasses or gyros (e.g., to measure the orientation of the motion sensor 410 and/or the mobile device). In some cases, the measurement information obtained by the motion sensor 410 can be in the form of one or more a time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 410 can be directly integrated into a co-processor 474 configured to processes measurements obtained by the motion sensor 410. For example, a co-processor 474 can include one more accelerometers, compasses, and/or gyroscopes, and can be configured to obtain sensor data from each of these sensors, process the sensor data, and transmit the processed data to the processor(s) 404 for further analysis.

Other sensors may also be connected to the peripherals interface 406, such as a temperature sensor, a biometric sensor, or other sensing device, to facilitate related functionalities. As an example, as shown in FIG. 4, the architecture 400 can include a heart rate sensor 432 that measures the beats of a user's heart. Similarly, these other sensors also can be directly integrated into one or more co-processor(s) 474 configured to process measurements obtained from those sensors.

A location processor 415 (e.g., a GNSS receiver chip) can be connected to the peripherals interface 406 to provide geo-referencing. An electronic magnetometer 416 (e.g., an integrated circuit chip) can also be connected to the peripherals interface 406 to provide data that may be used to determine the direction of magnetic North. Thus, the electronic magnetometer 416 can be used as an electronic compass.

A camera subsystem 420 and an optical sensor 422 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 424. The communication subsystem(s) 424 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 424 can depend on the communication network(s) or medium(s) over which the architecture 400 is intended to operate. For example, the architecture 400 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 400 can be configured as a base station for other wireless devices. As another example, the communication subsystems may allow the architecture 400 to synchronize with a host device using one or more protocols, such as, for example, the TCP/IP protocol, HTTP protocol, UDP protocol, and any other known protocol.

An audio subsystem 426 can be coupled to a speaker 428 and one or more microphones 430 to facilitate voice-enabled functions, such as voice recognition, voice replication, digital recording, and telephony functions.

An I/O subsystem 440 can include a touch controller 442 and/or other input controller(s) 444. The touch controller 442 can be coupled to a touch surface 446. The touch surface 446 and the touch controller 442 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 446. In one implementations, the touch surface 446 can display virtual or soft buttons and a virtual keyboard, which can be used as an input/output device by the user.

Other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of the speaker 428 and/or the microphone 430.

In some implementations, the architecture 400 can present recorded audio and/or video files, such as MP3, AAC, and MPEG video files. In some implementations, the architecture 400 can include the functionality of an MP3 player and may include a pin connector for tethering to other devices. Other input/output and control devices may be used.

A memory interface 402 can be coupled to a memory 450. The memory 450 can include high-speed random access memory or non-volatile memory, such as one or more magnetic disk storage devices, one or more optical storage devices, or flash memory (e.g., NAND, NOR). The memory 450 can store an operating system 452, such as Darwin, RTXC, LINUX, UNIX, OS X, WINDOWS, or an embedded operating system such as VxWorks. The operating system 452 can include instructions for handling basic system services and for performing hardware dependent tasks. In some implementations, the operating system 452 can include a kernel (e.g., UNIX kernel).

The memory 450 can also store communication instructions 454 to facilitate communicating with one or more additional devices, one or more computers or servers, including peer-to-peer communications. The communication instructions 454 can also be used to select an operational mode or communication medium for use by the device, based on a geographic location (obtained by the GPS/Navigation instructions 468) of the device. The memory 450 can include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 469 to facilitate GPS and navigation-related processes; camera instructions 470 to facilitate camera-related processes and functions; and other instructions 472 for performing some or all of the processes described herein.

Each of the above identified instructions and applications can correspond to a set of instructions for performing one or more functions described herein. These instructions need not be implemented as separate software programs, procedures, or modules. The memory 450 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for selecting a device to prioritize for a high power link, the method comprising:
   detecting a plurality of available devices in proximity of a mobile device;
   establishing a respective connection with at least a first device and a second device of the plurality of available devices using a first radio access technology (RAT);
   determining, using the respective connections, one or more metrics associated with the first device and the second device, wherein the one or metrics comprise a respective angle of arrival at the mobile device for each of the first device and the second device; and
   determining, based on the one or more metrics, to establish a high power link with the first device using a second RAT, wherein the second RAT utilizes more power than the first RAT.

2. The method of claim 1, further comprising:
   establishing the high power link with the first device using the second RAT; and
   using the high power link to perform a ranging action in connection with the first device.

3. The method of claim 1, wherein the first RAT is based on a BLUETOOTH™ protocol.

4. The method of claim 1, wherein the second RAT is based on an ultra-wideband communication protocol.

5. The method of claim 1, wherein determining, using the respective connections, one or more metrics associated with the first device and the second device comprises:
   receiving, from the first device and the second device, at least one respective signal; and
   determining the one or more metrics based at least on the at least one respective signal.

6. The method of claim 5, wherein the respective angle of arrival of the mobile device to each of the first device and the second device is determined based at least on an angle of arrival of the at least one respective signal received from the first device and the second device.

7. The method of claim 1, wherein determining, based on the one or more metrics, to establish the high power link with the first device using the second RAT comprises:
   determining to establish the high power link responsive to the mobile device having a substantially consistent angle of arrival with respect to the first device over a period of time.

8. A processor comprising:
   circuitry to execute one or more instructions that, when executed, cause the processor to perform operations comprising:
      detecting, in proximity of a mobile device, a first available device and a second available device;
      establishing a respective connection with each of the first available device and the second available device using a first radio access technology (RAT);
      determining, using the respective connections, one or more metrics associated with first available device and the second available device, wherein the one or metrics comprise a respective angle of arrival at the mobile device corresponding to the first available device and the second available device; and
      determining, based at least on the one or more metrics, to establish a high power link with the first available device using a second RAT, wherein the second RAT utilizes more power than the first RAT.

9. The processor of claim 8, the operations further comprising:
   establishing the high power link with the first available device using the second RAT; and
   using the high power link to perform a ranging action in connection with the first available device.

10. The processor of claim 8, wherein the first RAT is based on a BLUETOOTH™ protocol.

11. The processor of claim 8, wherein the second RAT is based on an ultra-wideband communication protocol.

12. The processor of claim 8, wherein determining, using the respective connections, one or more metrics associated with the first available device and the second available device comprises:
    receiving, from the first available device and the second available device, at least one respective signal; and
    determining the one or more metrics based at least on the at least one respective signal.

13. The processor of claim 12, wherein the respective angle of arrival of the mobile device to each of the first available device and the second available device is determined based at least on an angle of arrival of the at least one respective signal received from the first available device and the second available device.

14. The processor of claim 8, wherein determining, based on the one or more metrics, to establish the high power link with the first available device using the second RAT comprises:
    determining to establish the high power link responsive to the mobile device having a substantially consistent angle of arrival with respect to the first available device over a period of time.

15. A system comprising:
    an antenna; and
    at least one processor configured to perform operations comprising:
       detecting, in proximity of a mobile device, a first available device and a second available device;
       establishing a respective connection with each of the first available device and the second available device using a first radio access technology (RAT);
       determining, using the respective connections, one or more metrics associated with first available device and the second available device, wherein the one or metrics comprise a respective angle of arrival at the mobile device corresponding to the first available device and the second available device; and
       determining, based at least on the one or more metrics, to establish a high power link with the first available device using a second RAT, wherein the second RAT utilizes more power than the first RAT.

16. The system of claim 15, the operations further comprising:
- establishing the high power link with the first device using the second RAT; and
- using the high power link to perform a ranging action in connection with the first device.

17. The system of claim 15, wherein the first RAT is based on a BLUETOOTH™ protocol.

18. The system of claim 15, wherein the second RAT is based on an ultra-wideband communication protocol.

19. The system of claim 15, wherein using the respective connections to determine one or more metrics associated with the first device and the second device comprises:
- receiving, from the first device and the second device, at least one respective signal; and
- determining the one or more metrics based at least on the at least one respective signal.

20. The system of claim 19, wherein the respective angle of arrival of the mobile device to each of the first device and the second device is determined based at least on an angle of arrival of the at least one respective signal received from the first device and the second device.

\* \* \* \* \*

UNITED STATES PATENT AND TRADEMARK OFFICE
CERTIFICATE OF CORRECTION

PATENT NO. : 11,751,144 B2
APPLICATION NO. : 17/483114
DATED : September 5, 2023
INVENTOR(S) : Yann Ly-Gagnon and Arun Unkn Page 1 of 1

It is certified that error appears in the above-identified patent and that said Letters Patent is hereby corrected as shown below:

On the Title Page

Column 2 Item (57) (Abstract), Line 11, after "one or" insert -- more --;

In the Claims

Column 15, Line 29, in Claim 1, after "one or" insert -- more --;

Column 16, Line 8, in Claim 8, after "one or" insert -- more --; and

Column 16, Line 60, in Claim 15, after "one or" insert -- more --.

Signed and Sealed this
Seventh Day of November, 2023

Katherine Kelly Vidal
*Director of the United States Patent and Trademark Office*